Patented June 30, 1953

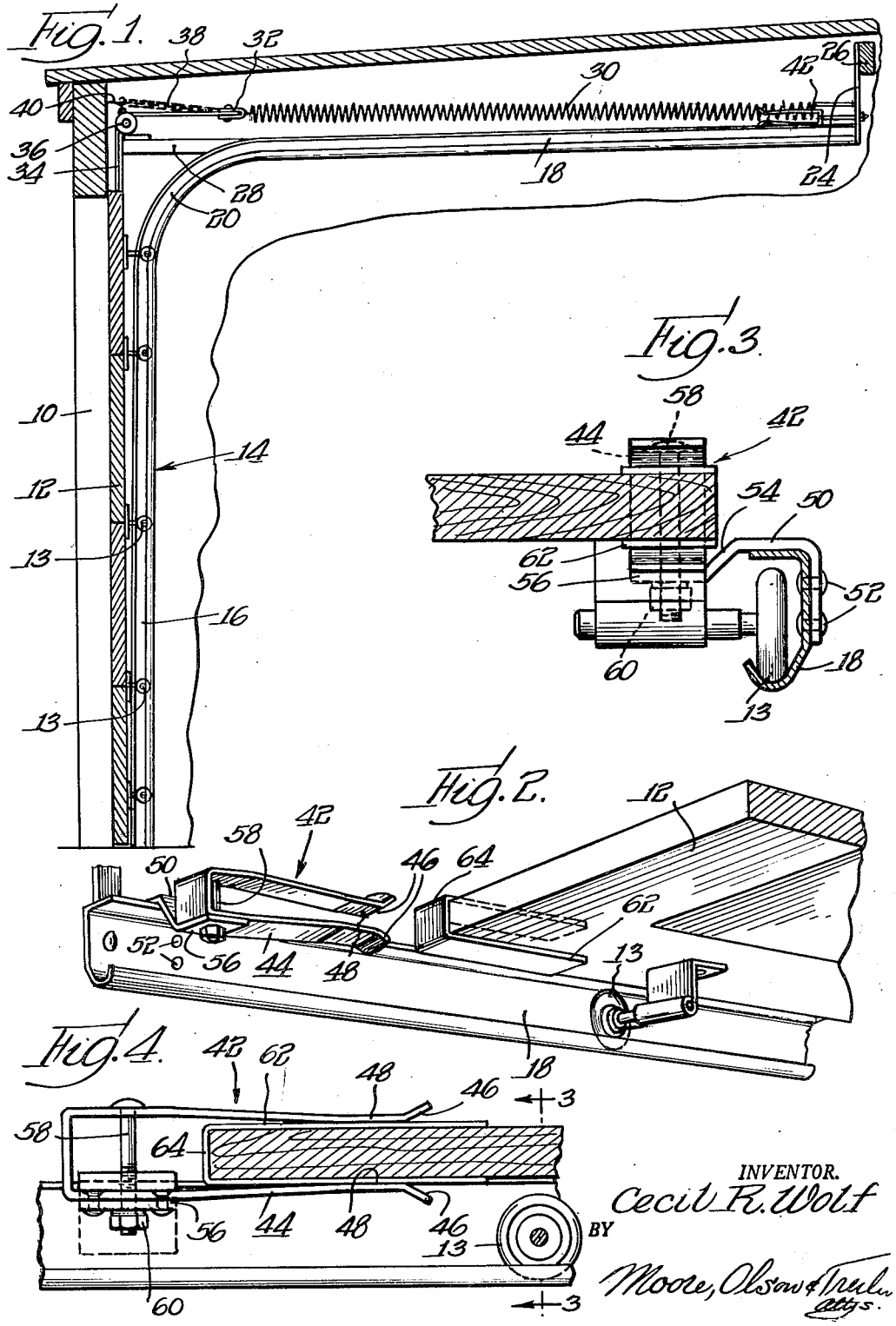

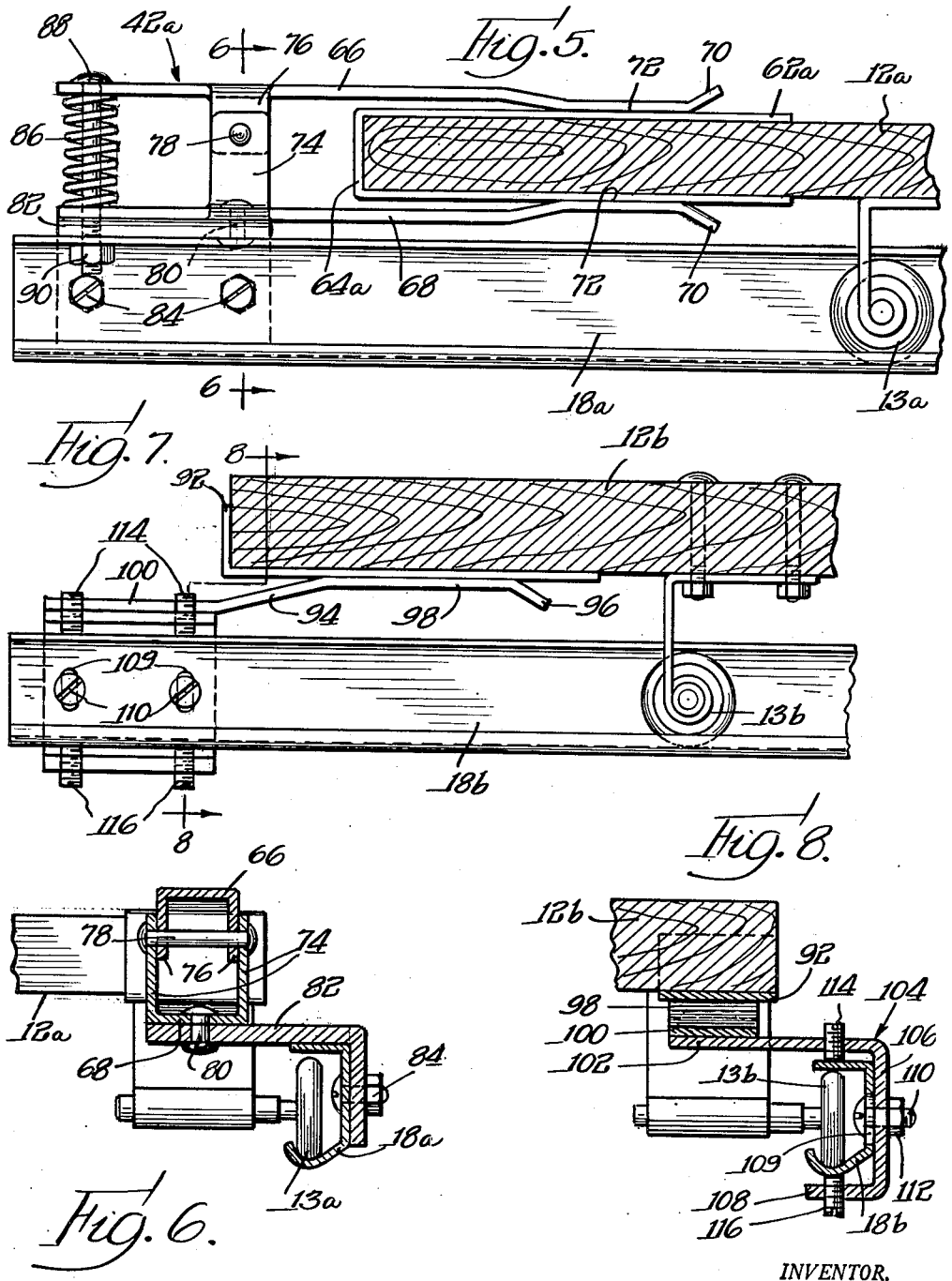

2,643,714

UNITED STATES PATENT OFFICE 2,643,714

OVERHEAD DOOR STRUCTURE

Cecil R. Wolf, Rock Falls, Ill., assignor to Frantz Manufacturing Co., Sterling, Ill., a corporation of Illinois Application August 10, 1950, Serial No. 178,671

4 Claims. (Cl. 160—191)

This invention is concerned generally with overhead door structure and particularly with means for braking the door as it approaches opened overhead position.

Overhead opening garage doors move from a closed vertical position to an opened overhead position and generally are counterbalanced in some manner to facilitate opening of the doors. Considerable momentum is attained by a door as it opens and when it reaches fully opened position there is a tendency for the door to continue past its fully opened position and then to rebound to a partially closed position, endangering the operator and often leaving insufficient clearance for any vehicle to pass beneath the door.

A broad object of this invention is to provide new and improved braking structure for overhead opening doors to prevent overshooting and rebounding of such doors.

Another object of this invention is the provision of door braking structure of resilient construction wherein cooperating braking surfaces carried by the door and by guiding rails for said door engage with one another to provide a surface contact the area of which increases as the cooperating braking surfaces engage one another more completely as the door continues to move following initial contact of the braking surfaces.

By having brake surfaces of fairly large area contact one another, the life of the braking structure is prolonged through the spreading out of wear and through the positive prevention of the forming of grooves, nicks, burrs and the like. Further, it has been found that the continually increasing area of contact provides a smoother braking action than is possible with line or point contact between stationary brake members and cooperating members on the moving door. Theoretically, friction between two surfaces is independent of the contacting area. Practically it has been found that the braking effect is increased with increase in area, at least within a certain range, probably due at least in part to imperfections in the surfaces, cohesion between the surfaces, by change in the coefficient of friction with age, wear, and heating.

A further object of this invention is the provision in overhead opening door construction of a brake supported by guiding tracks for the door and having spaced surfaces contacting opposite braking surfaces on opposite faces of the door to thereby brake the door evenly without applying stress to the rollers and mounting structure therefor supporting the door from the track.

Yet another object of this invention is the provision in overhead door construction of a brake member having a braking surface cooperable with a braking surface on the face of the door and transversely adjustable to vary the braking effect.

A further object of this invention is the provision in overhead opening door structure of a brake member for frictionally bringing the door to rest and providing a positive stop to stop the door in case it is not completely stopped frictionally.

Other and further objects and advantages of the present invention will be apparent from a perusal of the following description when taken in conjunction with the accompanying drawings wherein:

Fig. 1 is a fragmentary longitudinal sectional view showing a garage door and associated mounting structure including a brake embodying the principles of my invention;

Fig. 2 is a fragmentary perspective view on an enlarged scale showing the door brake;

Fig. 3 is a fragmentary cross sectional view showing the brake and door in braking engagement as taken along the line 3—3 of Fig. 4;

Fig. 4 is a detailed longitudinal view partially in section showing the brake and door in braking engagement;

Fig. 5 is a view similar to Fig. 4 showing a modification of the invention;

Fig. 6 is a cross sectional view taken along the line 6—6 of Fig. 5;

Fig. 7 is a view similar to Figs. 4 and 5 showing a further modification of the invention; and Fig. 8 is a cross sectional view taken along the line 8—8 of Fig. 7.

A garage door structure is shown generally in Fig. 1 and comprises a door jamb 10 and a hinged sectional overhead opening door 12 of the usual type. The door is mounted by means of rollers 13 fitting in a substantially channel shaped track 14 having substantially vertical and substantially horizontal sections 16 and 18 respectively, connected by a curved portion 20. The lower end of the substantially vertical portion 16 is mounted closer to the door jamb 10 than is the upper end thereof and the rollers 13 are spaced at correspondingly varying distances from the door 12 in order to wedge the door firmly against the jamb in closed position. Each of the horizontal portions 18 of the tracks 14 is supported at its rear extremity by means of a bracket or hanger 24. The brackets or hangers 24 are secured to any suitable cross member 26 such as a rafter of the garage. The tracks 14 are supported adjacent the curved sections 20 by means of a bracket 28 bolted or otherwise secured to the tracks and suitably secured to the door jamb or the garage frame. The substantially vertical portions 16 of the tracks are supported by brackets from the door jamb or garage frame in any suitable manner.

A helical spring 30 is secured on each side of the door to counterbalance the door and each spring is secured at the rear end by any suitable means to a fixed point such as one of the brackets or hangers 24. The opposite or front end of each spring 30 has a sheave or pulley 32. A cable 34 passes over each pulley 32 and over a second sheave or pulley 36 and extends to the lower edge of the door 12. Each cable 34 is suitably secured to a chain 38 having a link looped over a hook 40 carried by the door jamb 10. The tension of the spring can be adjusted by looping any selected one of the links of the chain 38 over the hook 40.

A brake 42 is secured to each track near the rear end thereof. In the modification of the invention shown in Figs. 2-4, each brake comprises a unitary spring clip 44 of substantially U-shaped construction with the open end of the clip facing toward the front of the garage. Outwardly deflected surfaces 46 are provided at the leading edge to cam the arms of the clip apart when contacted by the door. The surfaces 48 of the clip arms immediately adjacent the deflected portions 46 are very nearly parallel so that when they are forced apart by the camming action of the door against the deflected portions 46 they will become parallel and engage the door over a considerable area.

Each clip 44 is secured by a bracket 50 secured to the horizontal portion 18 of the track by means such as rivets 52. Each bracket is deflected downwardly as at 54 adjacent the inner edge of the track to which it is secured and then extends horizontally as at 56 transversely of the track. The spring clip 44 is secured to the bracket 50 by means of a bolt 58 passed through aligned apertures in the arms of the clip 44 and in the horizontal section 56 of the bracket 50. The clip is carried on top of the horizontal section 56 and the edge of the clip abuts the depressed portion 54 of the bracket to prevent rotation of the clip. A nut 60 is threaded on the end of the bolt and may be adjusted to vary the spacing between the substantially parallel surfaces 48 of the clip arms and thereby vary the braking effect of the brake.

The spring clip 44 may engage opposite faces of the door directly, but to protect the door and to improve the braking action a U-shaped scuff plate 62 is provided at each upper corner of the door 12 as best may be seen in Fig. 2. The scuff plate may be secured to the door in any suitable manner such as screws (not shown) passed through the scuff plate and into the door. Preferably screws or the like are passed only through the bight 64 of the scuff plate so that they will not be contacted by the arms of the spring clip.

When the door is raised from the lowered position of Fig. 1 to an opened overhead position, the upper or leading edge of the door approaches the brakes 42 in alignment with the spring clips 44. As the door or scuff plate 62 encounters the deflected end portions 46 of the spring clip, the arms of the clip are cammed apart and the parallel surfaces 48 of the spring clip contact the opposite outer faces of the scuff plate 62 frictionally to stop the door. The pressure exerted by the braking surfaces 48 of the spring clip 44 on the cooperating braking surfaces of the scuff plate 62 may be adjusted by means of the nut 60 on the bolt 58 to vary the braking effect and the braking effect increases as the contacting areas between the cooperating braking surfaces on the brake and on the scuff plate increase thereby bringing the door to a smooth stop. If the brake is not properly adjusted to stop the door entirely, overshooting of the door is prevented by the bight 64 of the scuff plate abutting the bolt 58. Continued frictional engagement of the braking surfaces prevents the door from rebounding to a partially closed position even if the scuff plate does engage the bolt 58. The door is readily withdrawn from the brake by pulling on the door to move it to closed position.

A modification of the invention is shown in Figs. 5 and 6 wherein the door 12a, rollers 13a, horizontal track section 18a and scuff plate 62a are similar to those described heretofore. The brake 42a comprises a pair of pivotally joined spaced apart arms 66 and 68 forming alligator type jaws. The arms 66 and 68 may be rigid or slightly flexible. The arms are provided with outwardly deflected end sections 70 and with confronting substantially parallel surfaces 72 adjacent the deflected sections. A pair of arms 74 extends upwardly from the lower arm 68 spaced a slight distance from the rear end thereof and a pair of depending arms 76 on the upper arm 66 fits between the arms 74. A pivot pin 78 passes through aligned apertures in the arms 74 and 76.

The lower arm 68 is secured by means such as a rivet 80 to the horizontal flange of an angle bracket 82 the vertical flange of which is secured by means such as nuts and bolts 84 to the horizontal track section 18a. A helical compression spring 86 is placed between the rear ends of the arms 66 and 68 and a bolt 88 passes through the arms, the spring, and the horizontal flange of the bracket and has a nut 90 threaded on it below the flange of the bracket. The limit to which the spring 86 forces the surfaces 72 toward one another is determined by the distance which the nut 90 is threaded on the bolt 88. The braking effect of the brake thus may be adjusted by threading the nut farther on or off the bolt.

The action of the brake shown in Figs. 5 and 6 is similar to that shown in the preceding figures, the scuff plate 62a engaging the outwardly deflected sections 70 to spread the arms apart and bring the surfaces 72 into parallelism and frictionally engaging the outer surfaces of the scuff plate 62a. If the brake is not adjusted to stop the door completely, the bight 64a of the scuff plate will engage the arms 74 and 76 positively to stop the door.

The modification shown in Figs. 7 and 8 comprises a door 12b, roller 13b, and horizontal track section 18b similar to those described heretofore. A scuff plate 92 applied to the door comprises an L-shaped bracket, thus protecting the underside and leading edge of the door. The brake comprises a single flexible arm 94 having a downwardly deflected leading or front section 96 and a friction plate portion 98 which is flexed into parallelism with the lower face of the scuff plate 92 by engagement of the scuff plate with the downwardly deflected section 96. The rear portion 100 of the arm 94 is offset downwardly from the friction plate portion 98 and is secured by any suitable means such as rivets to the horizontal flange 102 of a mounting bracket 104.

The bracket is further provided with a vertical bight 106 and a short horizontal flange 108. The horizontal track section 18b is provided with elongated vertical slots 109 and bolts 110 extend through these slots and their apertures in the vertical bight of the bracket 104. Nuts 112 threaded on the bolts 110 clamp the bracket to the track. Pairs of set screws 114 and 116 extend through the upper and lower horizontal flanges 102 and 108 of the bracket respectively and bear against the upper and lower surfaces of the horizontal track section 18b. The pressure exerted by the friction plate portion 98 against the contacting face of the scuff plate 92, and hence the braking action, may be adjusted by loosening the bolts and nuts 110 and 112 and adjusting the set screws 114 and 116 to slide the mounting bracket 104 up and down. When the bracket has been properly adjusted to cause the friction plate portion 98 to exert the desired pressure and braking action on the scuff plate 92 the nuts 112 are again tightened to maintain the bracket firmly in position.

The brakes of both tracks stop the door evenly with no tendency of the door to skew and bind in the tracks. It is within the contemplation of this invention that instead of a pair of brakes, a single brake can be used and located midway between the tracks. Where one or a pair of brakes are used, smooth braking action is insured with long life of the braking structure by the contact of parallel braking surfaces wherein the contacting area increases as the door continues to move following initial engagement of the braking surfaces. The brakes are adjustable to exert any desired braking action on the door and the brakes provide a positive stop to arrest the motion of the door if the door is not completely stopped by frictional braking action.

Although certain embodiments of my invention have been shown and described, it is to be understood that this is for illustrative purposes only and that the invention is to be limited only by the spirit and scope of the appended claims.

I claim:

1. In a door construction, a door shiftable substantially edgewise between closed and opened positions, a pair of substantially parallel braking plates on opposite faces of said door, a pair of tracks having substantially horizontal portions for guiding said door from closed to opened position, a pair of spaced parallel braking plates carried by said tracks and positioned to engage the braking plates on said door as said door approaches one of said positions frictionally to stop said door without shifting said door perpendicular to its faces, and means for adjusting the spacing between one of said pairs of parallel braking plates to vary the braking effect, the contacting areas of said plates and hence the braking areas thereof increasing with movement of said door following initial engagement of said braking plates.

2. In a door construction, a door shiftable substantially edgewise between closed and opened positions, means providing substantially parallel braking surfaces on opposite faces of said door, a pair of tracks having substantially horizontal portions for guiding said door from closed to opened position, means providing a pair of spaced parallel braking surfaces carried by said tracks and positioned to engage the braking surfaces on said door as said door approaches one of said positions, and means resiliently biasing the braking surfaces carried by said tracks toward one another, positive means controlling the extent of said resilient biasing, the contacting areas of said surfaces and hence the braking areas thereof increasing with movement of said door following initial engagement of said braking surfaces.

3. In a door construction, a door shiftable substantially edgewise between closed and opened positions, a frictional braking strip on one face of said door and of substantial extent in the direction of motion of said door, a pair of tracks having substantially horizontal portions for guiding said door from closed to opened position, a frictional brake plate carried by said tracks and positioned to engage the braking strip on said door as said door approaches one of said positions, and substantially parallel to said braking strip when said door is in that position, means for resiliently biasing said brake plate into contact with the braking strip on said door, and means for adjusting the pressure of said brake plate against the braking strip on said door, the contacting areas of said braking strip and said brake plate increasing with movement of said door following initial engagement of said braking strip and said brake plate frictionally to stop the door.

4. In a door construction, a door shiftable substantially edgewise between closed and opened positions, a substantially U-shaped strap over an end of said door providing substantially flat parallel braking surfaces on opposite faces of said door, a pair of tracks having substantially horizontal portions for guiding said door from closed to opened position, a pair of members providing a pair of opposed braking surfaces carried by said tracks in alignment with said door as said door approaches one of said positions, means for pivotally interconnecting said pair of members on said tracks, a helical spring urging the pair of members carried by said track toward one another, and outwardly deflected end sections on the pair of members providing the braking surfaces carried by said tracks to engage the braking surfaces on said door and thereby to cam the braking surfaces into flat frictional contact to arrest motion of said door.

CECIL R. WOLF.

References Cited in the file of this patent

UNITED STATES PATENTS

| Number | Name | Date |
|---|---|---|
| 897,747 | Joyce | Sept. 1, 1908 |
| 2,142,562 | Greegor et al. | Jan. 3, 1939 |
| 2,166,746 | Bartel | July 18, 1939 |
| 2,584,134 | Knutson | Feb. 5, 1952 |